Patented Feb. 26, 1924.

1,484,927

UNITED STATES PATENT OFFICE.

RAYMOND C. BENNER, OF BAYSIDE, AND GEORGE W. HEISE, OF ELMHURST, NEW YORK, ASSIGNORS TO UNION CARBIDE & CARBON RESEARCH LABORATORIES, INC., A CORPORATION OF NEW YORK.

STORAGE-BATTERY SEPARATOR AND PROCESS OF MAKING THE SAME.

No Drawing.  Application filed February 25, 1922.  Serial No. 539,074.

*To all whom it may concern:*

Be it known that we, RAYMOND C. BENNER and GEORGE W. HEISE, citizens of the United States, residing at Bayside and Elmhurst, in the county of Queens and State of New York, have invented certain new and useful Improvements in Storage-Battery Separators and Processes of Making the Same, of which the following is a specification.

This invention comprises a storage battery separator consisting of a porous or reticular sheet coated with an insulating plastic material insoluble in the battery electrolyte. In its preferred form, the separator is a textile fabric having its threads encased in celluloid or its equivalent. The invention also includes a process for preparing such separators.

It is known that celluloid possesses the necessary physical and chemical properties for storage battery separators, including resistance to corrosion, high insulating efficiency, and strength combined with flexibility. Sheet celluloid has accordingly been used in the preparation of separators, and various chemical and mechanical processes have been proposed for perforating such sheets to permit the passage of the electrolyte. We have discovered that an efficient celluloid separator of high porosity may be prepared without resorting to any special means for perforating the celluloid or otherwise treating it subsequent to the formation of the sheet. This result is attained by applying celluloid to an interlaced flexible material or woven fabric in such manner as to coat the interlaced or woven strands without obturating the mesh.

The separator is preferably prepared as follows: Cotton cloth is impregnated with a solution of celluloid in a volatile solvent by immersing it in the celluloid solution for a time sufficient for thorough saturation. Or the solution may be brushed, sprayed, or otherwise suitably applied to the cloth. The excess of celluloid solution is then removed. Its viscosity and adhesiveness are preferably such that the threads will be impregnated and will retain a surface layer of celluloid in solution while the residual solution may be drained away leaving the mesh substantially unobstructed. The cloth is next pressed or rolled into a smooth sheet and the volatile solvent allowed to evaporate or removed by suitably applied heat. The celluloid may be applied in plastic condition, instead of in solution.

The porosity of the separator may be regulated as desired by the selection of fabrics having a fine, intermediate, or coarse weave. This will be determined by the type of cell in which the separator is to be used. Good results are also obtained by impregnating felted fibrous material or porous paper with celluloid solution. Separators so prepared have adequate porosity, owing to the volatilization of the solvent and the contraction of the celluloid coating upon drying out on the fibers or pore walls of the material.

As a result of the process described, the individual threads or fibers are indurated and the sheet as a whole is given adequate stiffness and strength for the purpose which it is designed to serve. It may, however, be mounted on a non-conductive frame, if desired. Separators so prepared are characterized by the presence of uniformly distributed, minute perforations which permit adequate circulation of the electrolyte, without affording a passageway for particles of active material which may tend to separate from the plates. The separator retains the active material in an efficient manner, as stated, yet the total area open to the electrolyte through the pores is relatively large, resulting in a small internal resistance.

The invention is not limited to the specific form described above. We may, for example, use other materials than cotton cloth as the separator base, such as other textile fabrics, or metal gauze. The celluloid may be replaced by any suitable acid resistant and insulating substance capable of application to fabric or the like. Collodion and phenolic condensation products may be mentioned among the equivalents of celluloid.

We are aware that it has been proposed to prepare separators by coating a fabric with a layer of silica, upon this as a base superposing a layer of rubber or celluloid and an external layer of bituminous material. Prior to our invention, however, it was not realized that celluloid or its equivalent might be applied directly to a fabric or porous material and used without further treatment as an efficient storage battery separator. The present invention is based upon the discovery of this fact. As herein described, we have invented a process for embodying the discovery in a new and improved separator, and the scope of our invention is defined by the appended claims.

We claim:

1. A storage battery separator comprising a porous material having a single insulating, acid resistant coating directly adherent thereto.

2. A storage battery separator consisting of a porous, filamentous material having its filaments coated with a single layer of an insulating, acid-resistant material.

3. A storage battery separator consisting of a porous, filamentous material having a single protective coating, composed of celluloid, upon its filaments.

4. A process of making storage battery separators, comprising applying celluloid in solution to a porous material so as to form a protective coating directly adherent to the pore walls of the material, and removing the celluloid from the interstices only of the porous material.

5. A process of making storage battery separators, comprising applying celluloid in solution directly to a textile fabric, removing the solution not absorbed by nor adherent to the strands of the fabric, pressing the fabric into a smooth sheet, and drying the sheet.

In testimony whereof, we affix our signatures.

RAYMOND C. BENNER.
GEORGE W. HEISE.